United States Patent [19]

Gupta et al.

[11] Patent Number: 5,254,516
[45] Date of Patent: Oct. 19, 1993

[54] FLUIDIZABLE ZINC TITANATE MATERIALS WITH HIGH CHEMICAL REACTIVITY AND ATTRITION RESISTANCE

[75] Inventors: Raghubir P. Gupta; Santosh K. Gangwal, both of Durham, N.C.; Suresh C. Jain, Morgantown, W. Va.

[73] Assignee: Research Triangle Institute, Research Triangle Park, N.C.

[21] Appl. No.: 858,215

[22] Filed: Mar. 26, 1992

[51] Int. Cl.⁵ .................. B01J 21/16; B01J 20/12; B01J 20/06; B01D 53/02
[52] U.S. Cl. .................. 502/84; 423/240.5; 423/244.01; 502/9; 502/52; 502/402; 502/404; 502/406; 502/407; 502/410; 502/415; 95/108; 95/135; 95/136; 96/150
[58] Field of Search .................. 502/9, 84, 400, 404, 502/406

[56] References Cited

U.S. PATENT DOCUMENTS

| | | | |
|---|---|---|---|
| 4,287,050 | 9/1981 | Eastman et al. | 208/216 R |
| 4,977,123 | 12/1990 | Flytzani-Stephanopoulos et al. | 502/84 |
| 5,130,097 | 7/1992 | Bissett | 423/244 |

*Primary Examiner*—Paul E. Konopka
*Attorney, Agent, or Firm*—Oblon, Spivak, McClelland, Maier & Neustadt

[57] ABSTRACT

Highly durable and chemically reactive zinc titanate materials are prepared in a particle size range of 50 to 400 μm suitable for a fluidized-bed reactor for removing reduced sulfur species in a gaseous form by granulating a mixture of fine zinc oxide and titanium oxide with inorganic and organic binders and by optional additions of small amounts of activators such as CoO and $MoO_3$; and then indurating it at 800° to 900° C. for a time sufficient to produce attrition-resistant granules.

19 Claims, No Drawings

FLUIDIZABLE ZINC TITANATE MATERIALS WITH HIGH CHEMICAL REACTIVITY AND ATTRITION RESISTANCE

This invention was made with Government support under Contract No. DE-AC21-88MC25006 awarded by the United States Department of Energy. The U.S Government has certain rights in this invention.

BACKGROUND OF THE INVENTION

1. Field of the Invention

This invention relates to fluidizable zinc titanate materials in a particle size range of 50 to 400 $\mu$m, which have high chemical reactivity for reduced sulfur species such as $H_2S$, COS, and $CS_2$, high sulfur capture capacity, and good regenerability. Most importantly, this invention involves preparing zinc titanate materials with high attrition resistance, comparable to commercial fluid catalytic cracking (FCC) catalysts.

2. Discussion of the Background

Coal represents our largest fossil energy. The efficiency of converting this stored chemical energy to commonly used electrical energy can be improved significantly if the coal is first gasified and the resulting hot fuel gas is oxidized in either a turbine or a fuel cell. The projected thermal efficiency for such a system can be as high as 50%, compared to 30% to 35% for conventional coal combustion systems.

One of the major problems encountered in this approach is the presence of sulfur in coals, which is converted primarily to $H_2S$ and to some extent to COS and $CS_2$ during gasification. During combustion of the fuel gas in a turbine, $H_2S$ oxidizes to $SO_2$, which is a precursor to "acid-rain." In addition to its toxicity to the environment, higher concentrations of $H_2S$ (several thousand ppm) are also detrimental—the gas is corrosive to turbine blades, other equipment, and instruments and adversely affects the performance of molten carbonate fuel cells due to sulfur poisoning of electrodes. Therefore, the $H_2S$ concentration level in the fuel gas must be on the order of a few ppm or less.

Well-known processes for removing $H_2S$ from fuel gas are wet processes operated within a liquid phase, for example, an amine solution. These processes, which operate at room temperature or relatively low temperatures, require cooling of the fuel gas and therefore impose a severe thermal penalty. Furthermore, the costs associated with these wet techniques for treatment of process-generated wastewater are relatively high. Therefore, to improve the process performance it would be desirable to have an easily regenerable sorbent for removal of reduced sulfur species at high temperature. Good regenerability would decrease not only the cost of the sorbent but also the costs associated with frequent loading and unloading of the reactors and the costs associated with disposal of used sorbent.

Earlier sorbent development work focused on iron oxide. U.S. Pat. No. 4,089,809, assigned to W. L. Farrior, disclosed a solid adsorbent consisting of iron oxide supported on silica for removal of $H_2S$ from hot gaseous mixtures. Adsorbent was prepared in the form of pellets by admixing $Fe_2O_3$, silica, and a suitable binder and tested in a fixed-bed reactor. No mention is made of sorbent suitable for fluidized-bed operation. Also, although it is claimed that the sorbent thus prepared has slightly better mechanical strength than one prepared by Shultz et al. (U.S. Pat. No. 3,579,923) on fly ash support, no results have been reported on the crush strength of the reacted pellets. Furthermore, no mention has been made of the nature of the fuel gas tested. It is widely known that highly reducing fuel gas leads to excessive weakening of iron oxide sorbents as a result of formation of iron carbide and reduction of iron oxide into metallic form. Moreover, the chemical equilibrium conditions impose a limit on iron oxide as to its efficacy in reducing $H_2S$ levels down to a few ppm levels, depending on the temperature and water vapor content of coal gas. For example, at 550° C. with 20% water vapor in gas, theoretically iron oxide sorbents can reduce $H_2S$ levels down to no less than 361 ppm.

Studies at the U.S. Department of Energy's Morgantown Energy Technology Center (DOE/METC) and elsewhere revealed that zinc oxide by itself can reduce $H_2S$ levels of fuel gas down to a few ppm level. In fact, a U.S. patent was granted to Institut Francais du Petrole of France (U.S. Pat. No. 4,088,736) in which a zinc oxide sorbent supported on silica and/or alumina was claimed. This sorbent was prepared by admixing zinc oxide, alumina, and a metal oxide, making a paste by adding water; extruding the paste into the desired shape; and allowing the extrudates to indurate between 500° and 1000° C. The sorbent was used in fixed beds. While, it has been disclosed that the process could be carried out in fluidized or moving beds, a sorbent material suitable for fluidized-bed application was neither prepared nor claimed.

Although the above patent discloses a process for desulfurization of a fuel gas, the gas composition used in testing the sorbents shown in embodied examples is not realistic. The gas containing 16.6% CO, 16.6% $H_2$, 33.3% $N_2$, and 33.3% $H_2O$ is mildly reducing compared to actual gasifier gases such as Texaco or Shell. Despite the mild reducing nature of the gas tested, data shown in Example 8 of the patent indicate a 10% to 20% drop in crush strength and a 5% to 10% increase in bulk density, both indicating a deterioration in sorbent structure. The pure ZnO sorbents (supported on an inert support) have been known to lose zinc due to the reduction by CO and/or $H_2$ present in the fuel gas thereby resulting in zinc vaporization which further leads to sorbent decrepitation.

Later sorbent development activities focused on the development of zinc ferrite sorbent, which was prepared by mixing equimolar amounts of zinc oxide and iron oxide. U.S. Pat. No. 4,769,045, assigned to Thomas Grindley of the U.S. Department of Energy, disclosed a process for removing $H_2S$ from coal gasifier gas using a fixed bed of cylindrical extrudates of zinc ferrite. Although the fixed bed of zinc ferrite extrudates exhibited satisfactory performance in terms of bringing down the $H_2S$ levels of coal gas to a few ppm levels, it suffered many limitations, including poor temperature control during highly exothermic regeneration of sulfided sorbent, unsteady state operation, and a nonuniform regenerator off-gas composition. Furthermore, high reaction temperatures (550° C. or higher) and/or highly reducing fuel gases led to sorbent decrepitation due to excessive reduction of iron oxide and zinc vaporization as discussed earlier.

To overcome sorbent weakening problems, AMAX conducted a study to develop a method to produce durable zinc ferrite sorbents for fixed-bed applications. A U.S. Pat. (No. 4,732,888) was granted to AMAX, Inc., in 1988 that disclosed a recipe for producing durable zinc ferrite sorbents. Testing of the best AMAX zinc ferrite formulations at DOE/METC and at the Research Triangle institute (RTI) under a variety of operating conditions showed that higher temperatures (>600° C.) and/or highly reducing fuel gas led to sorbent degradation for the reasons outlined above. The sorbent degradation was mainly due to "chemical" transformations rather than by mechanical stresses as noted previously. (See R. Gupta and S.K. Gangwal, "Enhanced Durability of Desulfurization Sorbents for Fluidized-Bed Applications," Topical Report to DOE/METC, Contract No. DE-AC21-88MC25006, June 1991, NTIS No. NTIS/DE 91002090.)

In addition to their fixed-bed applications, zinc ferrite sorbents were also developed for fluidized-bed systems. Fluidized-bed hot-gas desulfurization systems overcome some of the major limitations of fixed beds and offer much better gas-solid contact efficiency, better temperature control, and much greater flexibility in design alternatives for continuous sorbent circulation between absorption (sulfidation) and regeneration reactors, thereby leading to high desulfurization efficiencies. However, the sorbent needed for fluidized-bed reactors must be highly attrition resistant in order for it to withstand stresses induced by rapid temperature swings, chemical transformations, and fluidization and transport. Testing of a number of zinc ferrite sorbents in a bench-scale fluidized-bed reactor at DOE/METC and RTI indicated that, like fixed-bed pellets, the application of fluidizable zinc ferrite sorbent particles was also limited to a maximum temperature of 550° C. and to moderately reducing fuel gases containing at least 15% water vapor because of "chemical" attrition resulting from excessive reduction of iron oxide and zinc vaporization. (See R. Gupta and S. K. Gangwal, "Enhanced Durability of Desulfurization Sorbents for Fluidized-Bed Applications," Topical Report to DOE/METC, Contract No. DE-AC21-88MC25006, June 1991, NTIS No. NTIS/DE 91002090.)

Extensive kinetic and bench-scale testing of various candidate sorbents conducted to find alternatives to zinc ferrite sorbent that can be used at high temperatures with severely reducing gases showed that a zinc titanate sorbent can be used up to 750° C. and in the presence of severely reducing gases. The zinc titanate sorbent contains ZnO and $TiO_2$ in a suitable molar ratio (typical range being 0.8 to 2.0). Only ZnO is the reactive component of the sorbent while $TiO_2$ provides stability to the sorbent by preventing zinc vaporization. A series of zinc titanate sorbent pellets with different ZnO to $TiO_2$ molar ratios were investigated in fixed beds. (See Gangwal et al., "Bench-Scale Testing of Novel High-Temperature Desulfurization Sorbents," Final Report to DOE/METC, No. DOE/MC 23126-2662, 1988, NTIS No. NTIS/DE 89000935.)

The use of zinc titanate compounds for selectively removing $H_2S$ at a temperature of 450° to 600° C. was not new. In a series of U.S. patents granted to Phillips Petroleum Company (the two most relevant are Nos. 4,313,820 and 4,725,415), a process was disclosed for removal of $H_2S$ from gas streams. Also disclosed in these patents was the role of zinc titanate as a catalyst for a number of applications, including hydrodesulfurization for conversion of organic sulfur compounds into $H_2S$ and its subsequent absorption by the catalyst, hydrotreating, catalytic reforming, catalytic hydrodesulfurization and denitrogenation, hydrocracking, oxidative dehydrogenation, and selective hydrogenation. These inventions, however, dealt mainly with process studies in fixed-bed reactors demonstrating the use of zinc titanate as a catalyst material, using pellets of a size of 20 to 40 mesh. This particle size is obviously unsuitable for fluidized-bed applications. The $H_2S$ removal temperatures were around 400° C. In these patents, no sorbent material inventions were claimed and no procedures were described to produce fluidizable materials with high attrition resistance. Furthermore, no results were reported on the durability of these materials under a simulated fuel gas environment.

U.S. Pat. No. 4,977,123, assigned to Flytzani-Stephanopolous and Jothimurugesan of the Massachusetts Institute of Technology, disclosed a method for preparing mixed metal oxide sorbents, including zinc titanates, and catalysts in a pellet form suitable only for use in fixed bed reactors. The method consists of preparing a citrate precursor of the desired metal oxide, calcining it for 4 to 8 hours at 550° to 850° C., crushing and screening the calcined material to less than 210 $\mu$m size, adding 2 to 7% of clay binder (typically bentonite), making a paste and extruding it through a die to produce pellets of a desired size and shape, drying the extrudates, and finally recalcining them for 2 to 6 hours at 650° to 850° C. Thus, this process, requires eight to ten complex steps. Production of commercial quantities of zinc titanate (typically required for 100- to 200-MW integrated gasification combined cycle [IGCCI plants) using this complex technique is not believed to be economically viable. Furthermore, the invention describes a method to prepare sorbents for fixed-bed applications only. Methods to prepare attrition-resistant materials suitable for fluidized-bed applications are not mentioned. Also, this patent disclosure does not provide any data on either the short- or long-term chemical reactivity and mechanical strength of zinc titanate compounds produced by this invention. To the best of our knowledge, the zinc titanate materials prepared using the disclosed technique were never even tested in a simulated fuel gas environment, not to mention the real fuel gas. Therefore, it is not known whether the zinc titanate materials manufactured using this technique will have desirable properties in a real system.

Also, it is not certain, due to the complex nature of the manufacturing process, to what extent the physical and chemical properties of materials produced batchwise can be reproduced. In fact, later elaborate studies of this invention have shown that the material preparation technique is not reproducible. (See S. Lew, "High-Temperature Sulfidation and Reduction of Zinc Titanate and Zinc Oxide Sorbents," Ph.D. Thesis, Massachusetts Institute of Technology, 1990). If one were to use commercially available powders of zinc oxide and titanium oxide, this process cannot be used to produce fluidizable particles having a satisfactory value of mechanical strength even by crushing and screening. This is primarily because the particle size required in the intermediate step (after complexation) is between 63 to 210 $\mu$m. If these larger particles were used as raw materials, the resulting product may have a highly nonuniform zinc and titanium distribution in the sorbent matrix. This nonhomogenity in Zn and Ti distribution can lead to zinc vaporization and, in turn, to very poor attrition resistance. Furthermore calcination is probably the biggest contributor to the sorbent cost. Calcining twice in this process and that to for an excessive amount of time (6 to 14 hours) will substantially add to material cost and make it commercially unacceptable.

Finally, in theory, particles in the correct size range for fluidized beds could be produced by crushing and screening the extrudates produced by the above technique. However, this is not practical due to two reasons. Crushing and screening will produce angular particulates with sharp edges which would be subject to high attrition as has been observed. For example, see R. Gupta and S.K. Gangwal, "Enhanced Durability of Desulfurization Sorbents for Fluidized Bed Application", Topical Report to DOE/METC, Contract No. DE-AC21-88MC25006, June 1991, NTIS No. NTIS/-DE91002090. Also crushing and screening of the zinc titanate extrudates will give extremely low yield in the desired particle size range. Thus if the extrudates prepared by this technique were crushed and screening, the resulting particles would be unsuitable for fluidized bed operation. Furthermore, we have observed that crushing of calcined zinc titanate extrudates primarily leads to a flaky weak material not particles.

Attempts have been made to improve the attrition resistance of zinc titanate materials for fluidized-bed applications. In U.S. Pat. No. 4,477,592, assigned to Arthur Aidag, a process of catalytic reforming of a cyclopentane-containing organic feedstock using a zinc titanate catalyst was disclosed. A hydrogelling step was added in the manufacturing process to impart additional attrition resistance to the catalyst, which was used in a transport reactor type system. This hydrogelling step involved dispersion of a finely powdered (2 to 10 $\mu$m) zinc titanate in a suspension of c-alumina monohydrate with the addition of nitric acid to form a hydrosol, which was then dried, calcined at 648° C. for 2 hours, and finally crushed and screened to produce a 420- to 1190-$\mu$m size catalyst to be used in a transport reactor. The attrition resistance of the catalyst thus prepared was claimed to be an order of magnitude better than the material prepared without hydrogelling. However, the increase in attrition resistance occurred at the cost of significantly reduced catalyst capacity due to reduced zinc titanate content. The maximum zinc titanate content claimed for the hydrogel material was only 50% by weight. Also, suitability of the hydrogel zinc titanate material was demonstrated only as a reforming catalyst and not as a, high-temperature desulfurization agent. Furthermore, the significant number of complex wet processing steps required in hydrogelling the zinc titanate would significantly increase the cost of the material, thus reducing its commercial viability.

Attempts were also made to produce zinc titanate materials in a granular form as aerogels suitable for a catalyst support primarily in polymerization and, to a lesser extent, in hydrogenation and isomerization applications. See U.S. Pat. Nos. 4,619,908 and 4,717,708, assigned to Cheng et al. of Stauffer Chemical Company. The preparation of these aerogels consisted of hydrolyzing zinc and titanium-containing solvents to produce a gel, then contacting the gel with an extraction fluid at supercritical conditions, and finally drying the gel. No specific mention of a zinc and titanium combination is made in the examples included in the patent. Also, because in the invention, materials were produced primarily for catalyst support, no specific mention of either particle size or attrition resistance is made. The manufacturing process involved a series of complicated, hard to reproduce and control, steps which are unlikely and expensive for commercial-scale manufacturing. The material has high surface area and very high pore volume and is only suitable as a catalyst. Very high pore volumes are known to lead to materials of poor strength, which would be very unsuitable in fluidized-bed reactors.

OBJECTIVES OF THE INVENTION

Despite the work discussed in the previous section, there remains a need to prepare durable zinc titanate materials for fluidized-bed applications. Hence, the prime objective of this invention is to provide a technique for producing durable zinc titanate-based materials primarily for desulfurization of hot coal-gasifier gas. The durability is defined as the ability of these materials to maintain the desired physical and chemical characteristics over the long term in a continuous operation in a fluidized-bed system. The most desired physical characteristic is high resistance to attrition. The desired chemical characteristics include high *sulfidation and regeneration efficiency and high chemical reactivity for $H_2S$ and COS.

A second objective of this invention is to provide a composition that would permit high sulfur absorption capacity in the sulfidation reactor with minimum zinc vaporization and would minimize sulfate formation in the regeneration reactor.

A third objective of this invention is to provide a process to produce these materials in a particle size range of 50 to 400 $\mu$m suitable for fluidized-bed reactors including: bubbling, slugging-, circulating-, fast-, turbulent-, and transport-type reactors.

A fourth objective of this invention is to provide a process to produce these materials that is simple, relatively inexpensive, and easily scalable. This implies using commercially available chemicals, reagents, and equipment and employing a minimum number of steps, unlike the inventions described previously.

Last but not least, a fifth objective is to provide a composition that, in addition to gas desulfurization, would permit removal of other fuel gas contaminants, such as ammonia, tar, chloride, and alkali, by adding small amounts of metal oxides.

These and other objectives will become clear when considered in the context of the following disclosures, examples, and appended claims.

SUMMARY OF THE INVENTION

According to the invention, a technique is provided for preparing zinc titanate materials in a particle size range of 50 to 400 $\mu$m with high chemical reactivity for reduced sulfur species such as $H_2S$, COS, and $CS_2$, high sulfur capture capacity, good regenerability, and high attrition resistance, comparable to a commercial fluid catalytic cracking catalyst. The method involves intimate mixing of very fine zinc and titanium dioxide with organic and inorganic binders and modifiers in a specially designed granulator followed by addition of a liquid binder solution in the form of a fine spray. This results in the formation of nearly spherical granules. These granules are dried to impart green strength for further handling. The dried granules are then indurated at high temperature to obtain the desired combination of physical properties such as macroporosity, surface area, and attrition resistance. During the induration process, zinc oxide and titanium oxide react to form various zinc titanate phases by a solid-solid reaction and the organic binder burns away forming a porous structure. Furthermore, we have discovered that the attrition resistance of the zinc titanate materials thus prepared can be enhanced significantly by reacting them with H$_2$S to obtain a partially sulfided zinc titanate material. During this initial sulfidation, a portion of the zinc oxide is converted into zinc sulfide. The surface area of resulting zinc titanate materials is between 3 and 5 m$^2$/g and average pore volume is 0.2 to 0.3 cm$^3$/g with median pore diameter ranging from 1500 to 3000 Å.

The constituent powders, ZnO and TiO$_2$, used in this invention are commercially available. However, we have discovered that an average particle size of 0.1 to 0.5 μm and a surface area of 5 to 15 m$^2$/g for both zinc and titanium oxides produce the best materials. We have further discovered that the properties of these constituent powders largely determine the properties of the final product. Both rutile and anatase forms of titanium oxide can be used although we have primarily used rutile, which gives a good product.

The basic formulation, a combination of zinc and titanium oxides in a suitable ratio thus prepared provides excellent sulfidation and regeneration characteristics. The optional presence of additives such as compounds of sodium, nickel, molybdenum, cobalt, copper, and tungsten in suitable combinations and quantities during granulation further helps to improve the chemistry and adds secondary features to the materials such as the ability to decompose higher hydrocarbons (tar) and ammonia, and remove alkali and chloride present in fuel gas.

The nearly spherical shape, free-flow characteristics, and high attrition resistance (comparable to a commercial FCC catalyst) imparted to these materials by the addition of suitable amounts of inorganic binders such as bentonite, kaolinite, feldspar, forsterite, and calcium sulfate results in a product ideal for use in fluidized-bed reactors with easy handling and packing characteristics. These inorganic binders produce a strong permanent bridging action between the zinc titanate particles.

The presence of an organic binder such as Methocel results in sufficient surface area and porosity as this material burns away during the induration process and hence results in good chemical reactivity by minimizing the diffusional resistances. A combination of the two kinds of binders produces strong and porous particles that maintain their mechanical integrity and internal structure after repeated use in sulfidation and regeneration cycles.

DETAILED DESCRIPTION OF THE PREFERRED EMBODIMENTS

A number of techniques have been tried by various investigators to produce materials in a particle size range (typically 100 to 300 μm) suitable for fluidized-bed reactor applications. These techniques include crushing and screening of the extrudates used in fixed- and moving-bed reactors, impregnation over alumina, and spray drying. None of these technique produced materials satisfying the following requirements:

High absorption rate and capacity for H$_2$S.
High regenerability over several cycles without appreciable loss of desulfurization efficiency and sulfur capture capacity.
High attrition resistance over extended use.

The zinc titanate materials developed according to the present invention for removing H$_2$S and, when present, COS and CS$_2$ differ from the known materials by the fact they are both thermally stable and regenerable and are produced directly in the form of spherical particles ranging in size from 50 to 400 μm rather than extrudates or pellets used in fixed beds of 5 mm or larger. These materials rapidly remove substantial amounts of sulfur compounds and, most importantly, retain high chemical reactivity and mechanical strength over an extended period of use, i.e., over numerous desulfurization-regeneration cycles, in a fluidized-bed reactor.

According to this invention, a series of zinc titanate materials were prepared by varying the zinc oxide to titanium dioxide molar ratio, inorganic and organic binders, etc. These materials were prepared using a granulator that operates in a batch mode. In the granulator, two horizontally mounted rotors, one low speed and one high speed, are concentrically mounted in the cylindrical product chamber. The low-speed (mixing) rotor is located near the periphery of the product chamber and supplies powder to the high-speed (chopper) rotor. The chopper rotor is located in the center of the chamber and is designed to admix and homogenize the charge of fine powders. After the powder is completely admixed, a liquid binder solution is evenly dispersed using an air atomizing spray nozzle throughout the dry powder.

As stated previously, the zinc titanate materials are primarily composed of zinc oxide and titanium oxide in a suitable ratio. The material also contains 2 to 10% inorganic binder such as bentonite, which is needed to impart strength at high temperatures.

According to this invention, zinc titanate materials may be prepared by the following successive steps. In the granulator, first zinc oxide, titanium oxide, and the clay binder (e.g., bentonite and kaolinite) are dry-mixed for 1 to 2 minutes. Approximately 15 to 20 weight percent of liquid binder, typically a 0.5 to 10% Methocel solution in water (depending on Methocel grade), is then added. The viscosity of binder solution is maintained between 400 and 500 cP for optimum yields. The typical binder addition time varies from 2 to 3 minutes. Following that, the slurry is allowed to granulate for 2 to 3 minutes. The wet granules thus prepared are dried in a tray drier to a moisture level of less than 2% at a temperature ranging between 110° and 150° C. for 45 to 60 minutes to impart green strength to the particles. Following the granulation, the material is indurated either in a muffle furnace or in a rotary calciner for 1 to 4 hours at a temperature ranging between 800° and 900° C.

We have discovered that a very fine size of zinc oxide, titanium oxide and clay binder give rise to a good quality product. The zinc oxide powder, which was found to be the most suitable in this invention, has an average particle size of 0.12 μm with a surface area of 9 m$^2$/g and with 99.4% purity. The particle size of zinc oxide used in earlier preparations of zinc titanate was approximately 130 μm (U.S. Pat. No. 4,313,820). Our product was procured from the Zinc Corporation of America and was designated as KADOX-91 1. This zinc oxide powder was produced using a French process in which zinc melt produced from zinc ore is boiled in a refining column at 907° C. producing zinc vapors that are made to react with a controlled amount of air to produce zinc oxide powder.

The titanium dioxide (TiO$_2$) powder which gave the best product had an average particle size of 0.5 μm with a surface area of 12 m$^2$/g. The specific gravity of the powder was 4.0 and it contained 94% TiO$_2$ and 4.5% Al$_2$O$_3$. The crystalline form of TiO$_2$ used was predominantly rutile, although anatase can also be used. The TiO$_2$ powder used in this invention was procured from duPont Company and has a designation of R-900. This was produced by flame oxidation of TiCl$_4$.

The inorganic binders used in this invention were primarily bentonite and kaolinite, although small amounts of feldspar, sodium silicate, forsterite, and calcium sulfate were also used to impart additional mechanical strength to particles. The bentonite used had an approximate composition of: SiO$_2$ - 63%; Al$_2$1O$_3$ - 21%; Fe$_2$O$_3$ - 3.0%; MgO - 2.5%; Na$_2$O (Na+K) - 2.5%; and H$_2$O - balance. The kaolinite clay had an approximate composition of: SiO$_2$ - 45%; Al$_2$O$_3$ - 38.5%; Fe$_2$O$_3$ - 0.5%; TiO$_2$ - 2%, Na$_2$O - 0.2%, CaO - 0.1%; and H$_2$O balance. The median particle size of kaolinite was 1.8 $\mu$m with a BET surface area of 9 to 11 m$^2$/g.

The organic binder used in these preparations was mainly Methocel, which has a chemical name of hydroxypropyl methyl cellulose (HPMC). This chemical is frequently used as a sustained release agent in matrix systems and is available in various grades. We have successfully used a series of grades of Methocel in our preparations. The viscosity of the organic binder solution at room temperature is very important and must be controlled carefully within a narrow range to obtain good yields in a desired particle size range. Other chemical reagents such as polyvinyl acetate (PVA), starch, molasses, lignin sulfonate and hydroxy propyl cellulose (HPC) can also be used. Methocel is produced by the Dow Chemical Company in the United States.

The particle size distribution of granulated product thus produced depends on a number of factors. The moisture content and the grade and amount of Methocel in the binder solution are the most critical factors. Other factors include the binder addition time, the air pressure used in the spray, and chopper speed. We have discovered that 15 to 18 weight percent of liquid binder produces a reasonably good yield, between 60 and 90% in a particle size range of 100 to 300 $\mu$m.

The induration, also called calcination, of granulated material thus produced can be carried out in either a rotary kiln or in a muffle furnace. For processing large quantities of material, use of a continuous rotary kiln is preferred over a muffle furnace. We have discovered that the induration step can be conducted at 800° C. for 2 hours. We investigated the effect of induration time on the performance of zinc titanate materials and found that 2 hours' induration at 800° C., at least for the bentonite-containing material, appears to be adequate. Note that higher induration times may lead to slightly better mechanical strength of the final product, but the additional cost associated with that prolonged induration may not justify the marginal improvement in mechanical strength. Indeed, the attrition resistance of a 4-hour indurated material was nearly equal to that of a 2-hour indurated sample. During the process of induration, a solid-solid reaction between zinc oxide or titanium oxide occurs to form zinc titanate. The following are the possible reactions which can occur at temperatures above 700° C.:

$$ZnO + TiO_2 \rightarrow ZnTiO_3$$

$$2ZnO + TiO_2 \rightarrow Zn_2TiO_4$$

$$2ZnO + 3TiO_2 \rightarrow Zn_2Ti_3O_8$$

All the above reactions are thermodynamically possible. However, we have discovered that the zinc titanate materials produced using the above-described process are primarily a mixture of Zn$_2$TiO$_4$ and Zn$_2$Ti$_3$O$_8$, as detected by X-ray diffraction (XRD) patterns. The presence of ZnTiO$_3$ is rarely detected. The actual amount of Zn$_2$TiO$_4$ and Zn$_2$Ti$_3$O$_8$ depends primarily on the stoichiometry of the material, i.e., zinc oxide to titanium oxide ratio in the material.

During the induration process, the organic compound such as Methocel used as a binder tends to burn forming a porous structure which, in simplistic terms, is equivalent to a network of mini canals that allow easy and quick flow of the reactant and product gases to a large reacting surface area.

For the bentonite-containing zinc titanate materials, we have found that a upper limits exists for the induration temperature. This is around 870° C. above which decomposition in bentonite structure occurs as detected by differential thermal analysis. However, this limit is about 120° C. higher for kaolinite-containing materials. The thermal decomposition of kaolinite begins around 990° C. This finding may explain some of the previously observed phenomenon of unusual pore growth in zinc titanate materials which were calcined at temperatures higher than 870° C. (See Gangwal et al. "Bench-Scale Testing of Novel High Temperature Desulfurization Sorbents", Final Report to DOE/METC, No. DOE/MC231 26-2662, 1988, NTIS No. NTIS/DE 89000935.)

The zinc titanate materials prepared in this invention contained zinc oxide and titanium oxide in a molar ratio of 0.8 to 1.5. The bentonite content of these materials was between 2 and 5%. A series of materials were prepared by varying the ZnO-to-TiO$_2$ ratio and the binder content as it will become clear from the appended examples. Specifically, the Materials B to F were prepared using the granulation technique.

A detailed physical and chemical characterization of these materials was carried out. The physical characterization included particle size distribution, pore size distribution, BET surface area, XRD patterns, scanning electron microscopy (SEM) coupled with energy-dispersive X-ray (EDX), and attrition resistance. The chemical characterization consisted of thermogravimetric analysis (TGA) and determination of zinc and titanium content either by inductively coupled plasma (ICP) or atomic absorption (AA) techniques. These characterizations were done before and after actually testing these materials in a high-temperature, high-pressure bench reactor.

A selected number of materials were tested in a bench-scale high-pressure, high-temperature fluidized-bed reactor. This reactor system has been described in detail previously, and we are not making any claims on either design or operation of this reactor system. Briefly, this system consists of a gas delivery system, a fluidized-bed reactor, and a gas analysis system. In the gas delivery system, a simulated fuel gas of any desired composition can be generated using the bottled gases, a series of mass flow controllers, and water pumps. This gas is then preheated to a desired temperature and sent to the fluid-bed reactor, housed in a three-zone furnace. The fluid-bed reactor is a 2-inch-I.D. SS-316 pipe with a porous alumina plate in the bottom that acts as a gas distributor. The exit gas from the reactor is cooled to condense the steam and a slip stream of water-free gas is sent to the gas analysis system, which consists of two gas chromatographs (GC) for continuous analysis of reactor effluent stream.

A typical bench run consists of loading 350 g of the sorbent prescreened in a particle size range of 100 to 300 μm and heating the reactor to a desired temperature ranging between 550° and 750° C. with continuous flow of nitrogen (inert gas). Once the desired temperature is attained, the flow of fuel gas to the reactor is started and the concentration of $H_2S$ is measured continuously in the effluent gas. Once the $H_2S$ concentration reaches 500 ppmv, the run is stopped and the system is prepared for regeneration. The regeneration of sulfided material is carried out at 760° C. with 2 to 5% oxygen in nitrogen. These regeneration conditions are needed to prevent zinc sulfate formation and to avoid deadburning of the material due to an excessive rise in temperature because of the highly exothermic nature of the regeneration reaction. The regeneration of the sulfided material is carried out until the $SO_2$ concentration in the reactor effluent stream reaches below 200 ppm. These sulfidation-regeneration cycles are repeated as many times as desired. Typically each material is tested for 10 cycles to obtain meaningful data on material durability.

At the end of a 10-cycle run, the material is removed from the reactor and all physical and chemical characterizations, as listed above, are carried out on the reacted material to determine changes due to the reaction. Most materials tested during this invention did not exhibit any significant changes in their physical and chemical properties as illustrated in the embodied examples.

In addition to the desired chemical reactivity, the zinc titanate materials should possess a good mechanical strength. A direct measure of the mechanical strength of a catalyst or adsorbent used in the catalyst industry is the determination of its attrition resistance. There are no standard American Society for Testing and Materials (ASTM) procedures to measure the attrition resistance of particles in the 50- to 400-μm size range. However, each catalyst manufacturer has developed its own version of an attrition test. Nevertheless, a commercial FCC catalyst is used as a reference material in all tests. Initially, we used a single-hole attrition tester using a test procedure described in Anderson and Pratt (R.R. Anderson and K.C. Pratt, "Introduction to Characterization and Testing of Catalysts', Academic Press, Orlando, FL, 1985, pp. 190-196). A controlled sample of material was sheared in an attrition tube of 1 inch I.D. with a 0.4 mm hole in the bottom for gas flow. A gas flow rate of 7 slpm (standard liters per minute) produced a sonic velocity through the hole which led to high shearing of the particles. At the end of 1 hour, the amount of material lost from the tube in the form of fines was determined. This material loss was considered a loss due to attrition. Based on these data, an index called attrition resistance was calculated which was expressed as 100 minus percent loss of materials in the form of fines. The commercial FCC catalyst exhibited an attrition resistance value close to 100%, indicating very little loss due to attrition.

Later in this study, the single-hole attrition tester was replaced with a three-hole tester, which again was not a new discovery. It is used frequently in the catalyst industry. In fact, in U.S. Pat. No. 4,010,116, assigned to Secor et al. of Filtrol Corporation, a detailed description of this test method is given. In this test, unlike the humid air used by Secor et al. in that patent, we simply used house air, which had some humidity, and, in place of the attrition index, we calculated the attrition rate. Both these attrition tests used here are relative and an absolute value cannot be assigned. Thus, these tests are useful in establishing only a relative ranking of various materials in terms of their resistance to attrition. Nonetheless, by comparing the zinc titanate materials with a FCC catalyst which can be a benchmark, a meaningful relative measure of their attrition can be obtained.

The pore size distribution of these materials was measured using the AutoPore 11 9220 instrument manufactured by Micromeritics Instrument Company using standardized procedures. The BET surface area was measured using a Quantasorb analyzer, again using standardized procedures. The particle size distribution was determined using a sieve train and sonic sifter. The TGA reactivity was measured using a duPont 1090 Thermal Analysis System interfaced with an IBM computer in a simulated gas used in actual bench tests.

Table I shows the physical characterization of materials A to F carried out as described above. Material A is a baseline material supplied by United Catalyst, Inc. (designated as L3758), and is included here for comparison purposes. While, as stated earlier, Materials B to F were prepared using the granulation technique. Materials A, B, C, D, and E were tested with a spectrum of fuel gases. The average compositions of the three fuel gases used in this invention are given in Table II. These gas compositions cover a wide range representative of most commercial and semi-commercial gasifiers. The fuel gases II and III are extremely reducing because of the higher ratio of $(CO+H_2)$ to $(CO_2+H_2O)$. In contact with zinc titanate materials, these gas compositions can potentially lead to the reduction of zinc oxide present in these materials by the following reactions:

$$ZnO + CO \rightarrow Zn + CO_2$$

$$ZnO + H_2 \rightarrow Zn + H_2O$$

TABLE I

| Material | Physical Properties of Various Zinc Titanate Materials | | | | | |
|---|---|---|---|---|---|---|
| | A[a] | B | C | D | E | F |
| Particle Size Range (μm) | 100-300 | 100-300 | 100-300 | 100-300 | 100-300 | 100-300 |
| Nominal $ZnO/TiO_2$ Molar Ratio | 1.5 | 1.5 | 0.8 | 0.8 | 1.5 | 1.5 |
| Inorganic Binder | 2% Bentonite | 2% Bentonite | 2% Bentonite | 2% Bentonite 3% Forsterite | 5% Bentonite | 5% Kaolinite |
| Organic Binder | 0.1% Methocel | 0.1% Methocel | 0.1% Methocel | 0.1% Methocel | 0.1% Methocel | 0.1% Methocel |
| Average Pore Volume (cc/g) | 0.28 | 0.22 | 0.21 | 0.22 | 0.22 | 0.22 |
| Median Pore Diameter | 4144 | 2099 | 1889 | 1764 | 2157 | 1885 |

TABLE I-continued

Physical Properties of Various Zinc Titanate Materials

| Material | A[a] | B | C | D | E | F |
|---|---|---|---|---|---|---|
| (Å) | | | | | | |
| BET Surface Area (m²/g) | 2.5 | 3.4 | 4.0 | 3.7 | 3.5 | 3.9 |

[a]Produced by United Catalyst, Inc., with a designation of L-3758 and served as baseline material.

TABLE II

Average Composition (Volume %) of Three Fuel Gases Used in the Study

| Gas | Fuel Gas I[a] | Fuel Gas II[b] | Fuel Gas III[c] |
|---|---|---|---|
| $H_2$ | 8.85 | 11.65 | 27.70 |
| CO | 15.01 | 18.97 | 39.44 |
| $CO_2$ | 6.89 | 6.75 | 13.10 |
| $H_2O$ | 19.17 | 5.12 | 18.64 |
| $H_2S$ | 0.44 | 0.55 | 1.12 |
| $N_2$ | 49.54 | 56.95 | 0.00 |
| Total | 100.00 | 100.00 | 100.00 |

[a]Simulated Kellogg-Rust-Westinghouse (KRW) developmental gasifier gas with high water vapor content.
[b]Simulated KRW gas with low water vapor content.
[c]Simulated Texaco oxygen-blown entrained-bed gasifier gas.

Indeed, Material A, which was prepared by United Catalysts, Inc., and used as a reference, when tested with Fuel Gas I exhibited zinc loss as indicated by a zinc plug in the line downstream of the reactor. X-ray diffraction patterns taken on this material indicated the presence of a small amount of free zinc oxide in the matrix and regions of zinc and titanium segregation as shown by SEM/EDX analyses.

On the other hand, SEM/EDX analyses of the materials produced by the disclosed granulation technique indicate a highly homogeneous distribution of zinc and titanium in the matrix. X-ray diffraction patterns taken on these materials showed no free zinc oxide. The zinc titanate was predominantly found in $Zn_2TiO_4$ and $Zn_2Ti_3O_8$, crystalline phases as stated earlier. The presence of $ZnTiO_3$ crystalline phase was hardly detected.

Examination of representative samples of materials produced by the granulation technique in a scanning electron microscope indicated a nearly spherical shape of the particles. The preliminary estimate of sphericity made using the scanning electron micrographs was between 0.9 and 0.95. According to the definition of sphericity, a perfectly spherical body will have a value of 1.0 for sphericity. On the other hand, fluidizable particles prepared using the crushing and screening operation have a typical value of sphericity between 0.7 and 0.75 thus indicating a significant presence of sharp edges. Therefore, the materials produced using the granulation technique were nearly in spherical shape and almost free of sharp edges.

The attrition resistance of the materials prepared using this technique was far superior than that of the baseline material. Table III shows the loss due to attrition in 5 hours and 20 hours in our 3-hole quartz attrition tester determined using the procedure described previously. The FCC catalyst used in this testing had a particle size between 74 and 150 μm with an average of 112 μm, and the zinc titanate materials were in the 100 to 300 μm range (average size - 200 μm) including the baseline material. The baseline material underwent an excessive attrition rate, while the materials produced using the disclosed technique showed a significant improvement in their attrition resistance over the baseline material. In fact, Material D, which contained 2% bentonite and 3% forsterite, showed a remarkable improvement in attrition resistance. It is to be noted here that the average particle size of zinc titanate materials is about twice that of the FCC catalyst. It is well known that higher particle sizes lead to greater attrition. The dependence of attrition on particle size is approximately parabolic (-dp 2). Hence, our zinc titanate material in the FCC particle size range would have significantly lower attrition rates than those shown in this table.

TABLE III

Loss Due to Attrition[a]

| Material | % Loss in 5 Hours |
|---|---|
| FCC Catalyst[b] | 1.6 |
| Material A | 79.8 |
| Material B | 55.9 |
| Material C | 41.1 |
| Material D | 28.7 |
| Material E | 32.1 |
| Material F | 37.9 |

[a]Data taken in a 3-hole quartz attrition tester at a gas velocity of 15 slpm.
[b]Average particle size 112 μm.

In addition to attrition resistance, another measure of mechanical strength of a material is its hardgrove grindability index (HGI) which is usually determined using an ASTM procedure (D-409-71). According to the definition, higher the value of HGI, more friable is the material and hence more prone to attrition. Table IV shows the values of HGI for glass beads, FCC catalyst, alumina, Material A (prepared using the granulation technique). As can be seen, the value of HGI for Material E and FCC catalyst are essential same whereas the value of the baseline UCI zinc titanate (Material A) is 40 percent higher than material E. These results are in agreement with the attrition results of Table III.

TABLE IV

Hardgrove Grindability Index (HGI) for Various Materials

| Material | HGI |
|---|---|
| Glass Beads | 32[a] |
| FCC Catalyst | 60[a] |
| Alumina | 105[a] |
| Material A | 81 |
| Material E | 58 |

[a]data from literature.

The attrition resistance of these materials may be further improved by the sulfidation reaction. We have discovered that the attrition resistance of the material removed from the reactor after 10 cycles of testing is significantly better than the fresh material. Partially sulfiding the fresh or reacted (regenerated material further enhances the attrition resistance. Table V shows some of the data on attribution rates for fresh, reacted, and partially sulfided materials taken in our three hole brass attrition tester at a gas flow rate of 7 slpm. Again, in this table, the FCC catalyst had a particle size of 74 to 200 mesh while Material E was in a size range of 100 to 300 μm. Hence, the actual % attrition loss for the FCC material in the particle size range of 100 to 300 pm will be 2.78 times higher than reported in Table V. The sulfided material here refers to the partial sulfidation of the 10-cycle regenerated material in a bench reactor.

TABLE V

Attrition Loss Data on Fresh, Regenerated, and Sulfided Material E

| | % Attrition Loss | |
|---|---|---|
| | 5 Hours | 20 Hours |
| Fresh | 32.10 | 89.00 |
| 10-cycle Regenerated | 28.74 | 87.46 |
| Sulfided | 2.90 | 14.28 |
| FCC Catalyst | 1.60 | 5.70 |

Therefore, there is at least an order of magnitude increase in the material attrition resistance just by adding a partial sulfidation step. The increase in attrition resistance due to partial sulfidation can be ascribed to: (1) increase in material particle density due to sulfidation; (2) transformation of rutile form of $TiO_2$ into anatase as confirmed by X-ray diffraction patterns; (3) formation of a smoother particle surface with less friction. We have not tested the attrition resistance of the material that has been prepared using the anatase form of $TiO_2$. However, based on our results, it is expected that this material may have significantly higher attrition resistance compared to our rutile-containing formulation.

In a commercial system, to minimize the material losses due to attrition, the material can be used in a partially sulfided state to improve its attrition resistance. Consequently, the partially sulfided material will substantially reduce the sulfate formation during regeneration which is believed to be catalyzed by zinc oxide. We have discovered that a complete sulfidation of zinc titanate material is not needed as partial sulfidation improves the attrition resistance significantly. As shown in Table VI, the zinc titanate Material E sulfided to 50% level (50% of ZnO present in the material transformed into ZnS) had a 5-hour attrition loss of 2.9%, while a 20% sulfided material had an attrition loss of 7.4% in 5 hours. These values are significant improvements over the fresh material which had a 32.1% loss in 5 hours.

TABLE VI

Attrition Loss as a Function of Extent of Sulfidation for Material E

| % Sulfidation | % Attrition Loss in 5 Hours |
|---|---|
| 0 | 32.1 |
| 20 | 7.4 |
| 50 | 2.9 |

In a commercial system, partial sulfidation of these materials may be achieved by treating them with a slipstream of $H_2S$ containing reducing gas under mildly fluidizing conditions. Once a desired level of sulfidation is achieved, the material may be used for an actual operation. Such an arrangement may lead to a significant reduction in the amount of material lost due to attrition, which will eventually result in tremendous cost savings despite some costs associated with initial partial sulfidation.

The materials disclosed in this invention can be used in a temperature range of 300° to 800° C. for removal of $H_2S$. The apparent activation energy for the sulfidation reaction is $$ZnO + H_2S \rightarrow ZnS + H_2O,$$

approximately between 14 and 17 kcal/mole as determined experimentally. This indicates that higher temperature will lead to significantly faster kinetics. Unlike Material A, prepared by the United Catalyst, Inc., which had zinc vaporization during the bench test, Materials B to F showed no signs of zinc loss even at temperatures of 750° C. and in a higher reducing gas such as Fuel Gas Composition III in Table II. This is primarily because of the highly uniform distribution of Zn and Ti in the matrix, as stated previously, which prevents zinc vapors from forming. The prebreakthrough values of $H_2S$ in the reactor exit gas are consistently below 20 ppm. Furthermore, higher pressure may be beneficial to $H_2S$ removal using these materials.

The fluidization conditions maintained in the reactor represented the bubbling behavior of the bed as the superficial gas velocities were three to four times the minimum fluidization velocity measured experimentally. The total gas flow rate to the reactor was about 35 slpm (standard liters per minute; ≃ 0° C. and 760 mm Hg). However, these materials may be used in any kind of fluidized-bed reactors including bubbling, fast, turbulent, circulating, and transport reactors.

We have not observed any material loss from our bench reactor during multicycle bench tests as a result of attrition unlike zinc ferrite, which exhibited excessive attrition even under the mild velocity conditions. Because of the nearly sonic velocities through the holes in our three-hole attrition tester, the material undergoes a very severe shearing. This type of shearing will never be experienced by the material in any kind of fluidized-bed reactor system. The attrition test described previously is not a true representation of material loss. The anticipated maximum velocity of the material in a commercial hot gas fluidized-bed system will not be higher than 10 m/s whereas in the attrition tester, average velocity is about 325 m/s at 7 slpm flow rate and 700 m/s at 15 slpm. Therefore, we do not expect any significant material loss from a commercial hot-gas desulfurization reactor operating in a continuous circulating-bed mode even with a transport-reactor system where velocities are at least an order of magnitude higher than the conventional bubbling fluidized-bed system. This loss will be at most comparable to that of an FCC reactor system, which is typically 0.5% of the catalyst inventory per day.

We have discovered that, in addition to removing $H_2S$ from flue gas, other contaminants present in the fuel gas can also be removed by the addition of a small amount of catalytic species or scavengers. For example, the addition of oxides of molybdenum, tungsten, cobalt, and nickel may be used to aid in cracking heavy hydrocarbons (tars) present in fuel gas. Tars are usually found in fuel gases derived from fixed-bed gasifiers such as the Lurgi and British Lurgi designs. Zinc titanate materials with these additives may also act as a catalyst to hydrodesulfurize the organic compounds present in the heavy hydrocarbons, such as mercaptans, thiophenes, and benzothiophenes, into $H_2S$, which can subsequently be removed by zinc titanate materials. Thus, these materials have the potential to remove heavy hydrocarbons from a coal-derived fuel gas, which are otherwise a nuisance.

In addition to tar decomposition, it is also possible that titanium oxide present in zinc titanate may react with the alkali present in fuel gas. Thermodynamically, the reaction between alkali and $TiO_2$ to form sodium titanate appears favorable. Although sodium or potassium titanate may not be further used in the process, the $TiO_2$ depleted as a result of this reaction may be replenished by adding the fresh material that will otherwise be needed to make up for the attrited material.

We have discovered that HCl present in the fuel gas, primarily evolving from coalbound chlorine, has no detrimental affect on the reactivity of zinc titanate materials, unlike zinc ferrite whose reactivity is killed by HCl. Although one would expect that HCl may react with ZnO to form $ZnCl_2$, the thermodynamics of $ZnCl_2$ formation at temperatures of 650° C. or higher is not very favorable. This suggests that a suitable HCl scavenger may also be added in zinc titanate that will react with HCl and reduce its level of clean fuel gas down to a few ppm to prevent potential corrosion of downstream process equipment such as turbine blades. Such a material may be a suitable alkali oxide, e.g., nahcolite and trona, which are naturally occurring complex sodium/potassium carbonates and both have been demonstrated to be successful in reducing HCl level to less than 1 ppm. These carbonates may be added during granulation in suitable quantities to the zinc titanate materials to react with the HCl present in the fuel gas.

The alkali chloride may not be regenerated back into carbonate; however, the addition of fresh material to replenish the losses due to attrition is expected to continuously provide fresh alkali carbonate for HCl removal. Such a scheme will work for HCl levels of up to 100 ppm in fuel gas.

Another potential contaminant in fuel gas is ammonia, which originates mainly from the fuel-bound nitrogen in coal. The quantity of ammonia in fuel gas may be as high as 2000 ppm. One of the most practical way to remove this contaminant is catalytic decomposition to nitrogen and hydrogen. Selection of a suitable catalyst for decomposition of ammonia in a temperature range of 600° to 750° C. has been a subject of considerable research. An important constraint in catalyst selection has been that the catalyst should not get poisoned with sulfur. Combinations of Group VIII metal oxides, e.g., derived from Co and Ni, with Group VIB metal oxides, e.g., derived from Mo and W, with and without additional Group VIIB and Group VIII metals such as Re and Ir could be suitable catalyst for ammonia decomposition.

All the above-described additives should be added during the granulation process to reduce the number of steps and the cost of the finished material. Suitable compounds of molybdenum, tungsten, cobalt, nickel, sodium, potassium, copper, etc., may be dissolved in deionized water and may be impregnated during granulation. In this way, additional steps required in conventional impregnation (once material is formed and indurated then the additives are impregnated and the material is re-indurated) can be eliminated. This may lead to considerable cost savings and simplicity of operation, allowing easy scale up in a commercial operation.

Calcination of molybdenum oxide and cobalt oxide containing zinc titanate material is best carried out by first calcining the material at 400° C. for about 2 hours, followed by sulfidation for about 4 hours using a gas containing 1 to 5% $H_2S$ in hydrogen at 400° C. This converts the Mo and Co to sulfides which are significantly more stable than the corresponding oxides. The resulting material is then calcined in a nitrogen stream at 800° C. for 2 hours. This procedure helps to prevent the coalescing of the Mo and Co crystallites. The resultinq material would have these crystallites separated from each other by zinc titanate crystallites which would act as a spacer (stabilizer) and prevent the coalescing during subsequent sulfidation and regeneration cycles.

Examples of some materials that we have successfully added during the granulation process include solutions of cobalt (11) nitrate hexahydrate, copper (11) nitrate hemipentahydrate, and ammonium hexamolybdate hexahydrate. The materials with these additives have been characterized physically and chemically and they appear to have good reactivity and other desired properties. The CuO in the material in this invention was added to bring down the $H_2S$ level of fuel gas to less than 1 ppm, which is needed for molten carbonate fuel cell systems to prevent poisoning of electrodes by sulfur. With only zinc titanate materials, chemical equilibrium constraints may not allow the $H_2S$ level of fuel gas to go much below 10 ppm depending on temperature and fuel gas compositions.

The following examples are presented to further illustrate this invention.

EXAMPLE 1

Zinc titanate Material B having an atomic ratio of Zn:Ti=1.5:1 (in Table I) was prepared by dry-mixing 695 g of KADOX-911 zinc oxide with 481 g of R-900 titanium dioxide and 24 g of bentonite in 245 mL of liquid binder (1% Methocel solution in water), which was added in the form of a fine spray within 4 minutes. The slurry was then allowed to granulate for 2 minutes at a speed of 6100 rpm. The wet granules were then dried at 130° C. in a tray drier for 45 minutes. Finally, the dried granules were then indurated in a rotary kiln at 800° C. for 4 hours and screened in a sieve shaker to obtain the material in the 100 to 300 μm size range. Approximately 600 g of material was obtained in this size range. Using the same procedure, a series of batches of this formulation were prepared.

This material was tested in our bench-scale high temperature, high pressure (HTHP) facility. This reactor system has previously been described. This material was tested with three different fuel gas compositions (I, II and III given in Table II). In each case, 350 g of material was loaded in the reactor and the desired gas composition was generated and passed to the reactor at a flow rate of about 35 slpm. This gave rise to a fluidization velocity of 3.5 times that of the minimum fluidization velocity measured experimentally at 15 atm and 650° C., the conditions of reactor operation.

In each fuel gas, a 10-cycle test was carried out with Material B at 15 atm and 650° C. The sulfidation cycle was terminated when the $H_2S$ concentration in the exit gas became about 500 ppm. The material reduced the $H_2S$ level of fuel gas in all three cases consistently below 20 ppmv. The sulfided bed was subsequently regenerated using 2 to 3% oxygen in nitrogen at 760° C. by mixing appropriate quantities of air and nitrogen and keeping the same fluidization conditions as the sulfidation cycle. Ten cycles of sulfidation-regeneration were carried out in each case of fuel gas.

Table VII shows the pertinent results of this testing. The attrition resistance of these materials after testing, in fact, increased, and no material was lost from the reactor. The sulfur capacity at the end of 10 cycles of the material in all three cases was approximately 50% of the theoretical maximum, unlike zinc ferrite, which had a capacity of 10% of its theoretical value at the end of 10 cycles. No zinc loss from the material was detected in all three cases as indicated by the Zn/Ti ratios of fresh and 10-cycle reacted materials despite the highly reducing nature of Fuel Gas II and III.

TABLE VII

| | Pertinent Results for Material B for Three Different Fuel Gases[a] | | |
|---|---|---|---|
| | Fuel Gas I | Fuel Gas II | Fuel Gas III |
| Sulfur Capacity[b] (g S/100 g material) | | | |
| Cycle 1 | 14.22 | 17.77 | 16.20 |
| Cycle 10 | 11.17 | 10.94 | 13.34 |
| Attrition Resistance[c] (%) | | | |
| Fresh | 97.3 | 97.3 | 97.3 |
| 10-Cycle Reacted | 97.0 | 99.5 | 97.9 |
| Zn/Ti Atomic Ratio | | | |
| Fresh | 1.51 | 1.51 | 1.51 |
| 10-Cycle Reacted | 1.51 | 1.51 | 1.51 |

[a]Run Conditions
  Sulfidation: 650° C., 15 atm;
  Regeneration: 760° C., 15 atm.
[b]Defined as amount of sulfur absorbed by the sorbent prior to breakthrough.
[c]Measured in single-hole attrition tester.

EXAMPLE 2

Zinc titanate Material C having a atomic ratio of Zn:Ti=0.8:1 was prepared by mixing 512 g of KA-DOX-911 zinc oxide with 664 g of R-900 $TiO_2$ and 24 g of betonite in 238 mL of liquid binder (1% Methocel in water) using exactly the same procedure as in Example 1. This material was tested with Fuel Gas Compositions II and III (Table II) at 650° C. and 15 atm pressure, again using the same procedure described in Example 1. Pertinent results are reported in Table VIII.

TABLE VIII

| | Pertinent Results for Material C for Two Different Fuel Gases[a] | |
|---|---|---|
| | Fuel Gas I | Fuel Gas II |
| Sulfur Capacity (g S/100 g material) | | |
| Cycle 1 | 14.13 | 10.48 |
| Cycle 10 | 12.30 | 9.53 |
| Attrition Resistance[b] (%) | | |
| Fresh | 96.6 | 96.6 |
| Reacted[c] | 98.7 | 91.4 |

[a]Run Conditions
  Sulfidation 650° C., 15 atm;
  Regeneration: 760° C., 15 atm
[b]Measured in a single-hole attrition tester.
[c]Regenerated material after 10 cycles Note that the theoretical capacity of this material is only 16.8 g S/100 g material as compared to 22.8 g S/100 g material for Material B. Therefore, about 73 to 84% capacity utilization was achieved in the case of Fuel Gas II, while approximately 60% utilization occurred in the case of Fuel Gas III.

Material B was also tested at 550° C. and 15 atm in our bench-reactor for two cycles to determine its reactivity at low temperatures. The average sulfur capacity in these two cycles was 7 g S/100 g material at 550° C. in Fuel Gas III as compared to about 10 g S/100 g material at 650° C. This indicates that the sulfidation reaction is predominantly kinetically controlled.

EXAMPLE 3

Zinc titanate Material D, having an atomic ratio of Zn:Ti=0.8:1, was prepared by mixing 496 g of KA-DOX-911 zinc oxide with 644 g of R-900 $TiO_2$, 24 g of bentonite and 36 g of forsterite in 245 mL of liquid binder (1% Methocel solution in water) using exactly the same procedure as in Example 1. This material was tested with Fuel Gas Composition III (Table II) at 650° C. and 15 atm pressure using the same procedure described in Example 1. Pertinent results are reported in Table IX.

TABLE IX

| | Pertinent Results for Material D for Fuel Gas III[a] |
|---|---|
| | Fuel Gas III |
| Sulfur Capacity (g S/100 g material) | |
| Cycle 1 | 7.40 |
| Cycle 10 | 6.34 |
| Attrition Resistance[b] (% Loss in 5 Hours) | |
| Fresh | 28.7 |
| 10-Cycle Reacted | 20.2 |

[a]Run Conditions
  Sulfidation: 650° C., 15 atm;
  Regeneration: 760° C., 15 atm.
[b]Measured in quartz three-hole tester using the procedure described in "Detailed Description Invention."

This material had the best attrition resistance compared to all the other materials tested as shown in Table III. The loss due to attrition significantly decreased after 10-cycle testing. The better attrition resistance of this material may be ascribed primarily to the addition of forsterite.

EXAMPLE 4

Zinc titanate Material E (having an atomic ratio of Zn:Ti=0.8:1) was prepared by mixing 674 g of KA-DOX-911 zinc oxide, 466 g of R-900 $TiO_2$ and 60 g of bentonite (inorganic binder) in 254 g of liquid organic binder (1% Methocel solution in the same procedure as Example 1. This material was tested with Fuel Gas Composition III (Table II) at 15 atm pressure and temperatures of 650° C. and 750° C. Testing of this material at 750° C. was aimed primarily at determining the zinc loss at this high temperature and its mechanical strength. Table X shows the pertinent experimental results.

TABLE X

| | Pertinent Results for Material E at 650° C. and 750° C. in Fuel Gas Composition III. | |
|---|---|---|
| | 650° C. | 750° C. |
| Sulfur Capacity (g S/100 g material) | | |
| Cycle 1 | 9.8 | 12.1 |
| Cycle 10 | 10.2 | 12.1 |
| Attrition Resistance[a] (% Loss in 5 Hours) | | |
| Fresh | 32.1 | 32.1 |
| 10-Cycle Reacted | 11.0 | 23.3 |
| Zn/Ti Ratio | | |
| Fresh | 1.52 | 1.52 |
| 10-Cycle Reacted | 1.51 | 1.45 |

[a]Measured in quartz three-hole tester.

At both the temperatures, no material was lost from the reactor; therefore, the material loss due to attrition in the reactor was zero. No evidence of significant zinc loss at 750° C. was observed, although the Zn to Ti atomic ratio decreased by 4.6%, which can be within the error band of the experimental measurement. The attrition resistance of the material due to reaction increased significantly due to the reasons stated previously as indicated by data in Table X.

EXAMPLE 5

A series of zinc titanate materials were prepared with the addition of various additives to impart a secondary function such as tar cracking, $NH_3$ decomposition, HCl and alkali removal, and also to further improve the attrition resistance. Table XI shows the details of these formulations.

TABLE XI

Additional Zinc Titanate Formulations Prepared with Various Additives

| Formulation No. | Chemical Composition | | | Desired Function |
|---|---|---|---|---|
| | Zn:Ti Atomic Ratio | Binder | Additive | |
| 1 | 1.5 | 15% Kaolin | 5% Feldspar | Impart additional high-temperature strength |
| 2 | 1.5 | 10% Kaolin | 3% Feldspar | Impart additional high-temperature strength |
| 3 | 1.5 | 5% Kaolin | 2% Feldspar | Impart additional high-temperature strength |
| 4 | 1.5 | 15% Kaolin | 5% Feldspar, 3% Forsterite | Impart additional high-temperature strength |
| 5 | 1.5 | 5% Kaolin, 2% Feldspar | 10% $MoO_3$ | Tar cracking and ammonia decomposition |
| 6 | 1.5 | 5% Kaolin, 2% Feldspar | 5% $CoO_3$ | Tar cracking and ammonia decomposition |
| 7 | 1.5 | 5% Kaolin, 2% Feldspar | 10% $MoO_3$, 5% $CoO_3$ | Tar cracking and ammonia decomposition |
| 8 | 1.5 | 5% Kaolin, 2% Feldspar | 2% CuO | Bring down $H_2S$ levels to below 1 ppm for fuel cell applications |

Other suitable additives may be similarly added to impart additional functions t the material. Other possible additives may be trona (sodium carbonate-based alkali), nahcolite, and suitable catalysts for ammonia and heavy hydrocarbon decomposition.

Although the present invention has been described in conjunction with the preferred embodiments, it is understood that modifications and variations may be resorted to without departing from the spirit and scope of the invention as those skilled in the art will readily understand. Such modifications and variations are considered to be within the purview and scope of the invention and the appended claims.

What is claimed as new and desired to be secured by letters patent of the United States is:

1. A durable, granulated zinc titanate sorbent material of spherical shape substantially free of sharp edges adapted for fluidized-bed applications, with a surface area of 1–15 $m^2/g$ and a particle size range of 50–400 $\mu m$, prepared from ZnO and $TiO_2$ in $ZnO/TiO_2$ molar ratios of 0.5–2.0, an activator/promotor selected from the group consisting of Groups VIB, VIIB and VIII metal compounds, and Groups IA and IIA alkali and alkaline earth metal compounds, in combination in 0–10% by weight, an inorganic binder in an amount of 2.0–15% by weight selected from the group consisting of finely-sized bentonite, kaolinite, forsterite, vermiculite, feldspar, portland cement, oil shale, calcium sulfate and mixtures thereof, and an organic binder in amounts of 0.1 to 5% by weight, selected from the group consisting of Methocel, polyvinyl acetate, cellulose, hydropropyl cellulose, starch, lignin sulfonate and molasses all granulated together, dried, then indurated in an oxidizing environment in a calcination step to form said material.

2. The material in accordance with claim 1, wherein the zinc oxide has an average particle size of 0.1 to 0.5 $\mu m$ and a surface area of 5 to 15 $m^2/g$.

3. The material in accordance with claim 1, wherein the $TiO_2$ is selected from a group consisting of rutile, anatase or a combination thereof, with an average particle size of 0.1 to 1 $\mu m$ and a surface area of 5 to 40 $m^2/g$ and $TiO_2$, both forms containing 0 to 10% alumina by weight.

4. A material in accordance with claim 1, whose attrition resistance is further improved by sulfidation to a level of 10 to 50% of sulfur capacity by reacting it with a gas containing at least 1000 ppm of a reduced gaseous sulfur species selected from the group consisting of $H_2S$ and COS.

5. A sorbent material in accordance with claim 1, wherein a compound selected from Groups VIB, VIIB and VII metal compounds in a concentration up to 5% has been added prior to granulation of the material for said sorbent.

6. A sorbent material in accordance with claim 1, wherein a compound selected from Groups IA and IIA metal compounds in a concentration up to 5% have been added prior to granulation of the material for said sorbent.

7. The material of claim 1, wherein said activator/promoter is selected from the group consisting of $MoO_3$, $CoO_3$, $WO_3$, $MoS_2$, $CoS_2$ and CuO.

8. A process for manufacturing a durable, granulated zinc titanate sorbent material of spherical shape substantially free of sharp edges adapted for fluidized-bed applications, said process comprising the following steps:

dry mixing finely-sized ZnO and $TiO_2$ in molar ratios of $ZnO/TiO_2$ of 0.5–2.0 and an inorganic binder selected from the group consisting of finely-sized bentonite, kaolinite, forsterite, vermiculite, feldspar, portland cement, oil shale, calcium sulfate and mixture thereof in an amount of 2–15% by weight, in a granulator for 1–4 minutes;

adding an organic binder in amount of 0.1–10% by weight selected from the group consisting of Methocel, polyvinyl acetate, cellulose, hydropropyl cellulose, starch, lignin sulfonate, molasses and mixtures thereof to said dry mixed material;

granulating the resulting mixture in said granulator at speeds of 2000–8000 rpm for 1–5 minutes to obtain granulates;

drying the granules at temperatures of 110°–150° C. for 40–80 minutes;

indurating the granules in a calciner at 750°–950° C. for 1–4 hours in an oxidizing environment;

screening the material to obtain granulated particles in a particle size range of 50–400 $\mu m$.

9. A process in accordance with claim 8, wherein additives selected from the group consisting of $MoO_3$, $CoO_3$, $WO_3$ $MoS_2$, $CoS_2$, and CuO are added during dry mixing individually or in any combination in an amount up to 10%.

10. A process in accordance with claim 9, wherein said additives are added in a slurry form along with the organic binder solution in the form of salt solutions of their nitrates, carbonates, hydroxides, or as complex salts selected from the group consisting of ammonium molybdate hexahydrate and ammonium tungstate hexahydrate in an amount sufficient to provide 10%, by weight, of an activator/promoter selected from the group consisting of Groups VIB, VIIB, VIII metal compounds, Group IA, IIA and mixtures thereof.

11. A process in accordance with claim 8, where the granulation step is carried out in a fluid-bed granulator.

12. A process in accordance with claim 8, where the induration step is carried out in a rotary calciner or a furnace operating in batch or continuous mode.

13. A process in accordance with claim 8, where induration is preceded by sulfidation at temperatures up to 800° C.

14. The process in accordance with claim 8, wherein the zinc oxide has an average particle size of 0.1 to 0.5 micron and a surface area of 5 to 15 $m^2/g$.

15. The process in accordance with claim 8, wherein the $TiO_2$ is selected from a group consisting of rutile, anatase or a combination thereof, with an average particle size of 0.1 to 1 micron and a surface area of 5 to 40 $m^2/g$ and $TiO_2$, both forms contain 0 to 10% alumina by weight.

16. A process in accordance with claim 8, wherein an activator/promotor selected from the group consisting of groups VIB, VIIB and VIII metal compounds, and groups IA and IIA alkali and alkaline earth metal compounds in a combination in an amount up to 10% is added to said dry mixed material prior to said granulating step.

17. A process in accordance with claim 8, further comprising improving attrition resistance by sulfidation to a level of 10 to 50% of sulfur capacity by reacting the screened material with a gas containing at least 1000 ppm of a reduced gaseous sulfur species selected from the group consisting of $H_2S$ and COS.

18. The process of claim 8, wherein said organic binder is added as a solution, in the form of a fine spray, the binder being present therein in concentrations 0.1-10%, the solution being added in an amount of 15-20% by weight, the solution being added over a period of 1-4 minutes.

19. The process of claim 8, wherein said organic binder is added in the form of a powder in quantities of 0.1-10% by weight.

* * * * *

UNITED STATES PATENT AND TRADEMARK OFFICE
CERTIFICATE OF CORRECTION

PATENT NO. : 5,254,516
DATED : October 19, 1993
INVENTOR(S) : Raghubir Gupta, et al It is certified that error appears in the above-indentified patent and that said Letters Patent is hereby corrected as shown below:

Column 4, line 28, "IGCCI" should read --IGCC]--.

Column 5, line 13, "wili" should read --will--;
line 15, "screening" should read --screened--;
line 23, "Aidag" should read --Aldag--;
line 30, "c-alumina" should read --α-alumina--.

Column 6, line 17, delete "`"`";
line 28, "bubbling" should read --bubbling- --.

Column 8, line 57, "KADOX-91 1" should read --KADOX-911--.

Column 9, line 9, "Al2O$_3$" should read --AL$_2$O$_3$--.

UNITED STATES PATENT AND TRADEMARK OFFICE
CERTIFICATE OF CORRECTION

PATENT NO. : 5,254,516

DATED : October 19, 1993

INVENTOR(S) : Raghubir Gupta, et al

It is certified that error appears in the above-indentified patent and that said Letters Patent is hereby corrected as shown below:

Column 13, line 56, "Ill" should read --III--.

Column 14, line 16, "-dp 2" should read -- $-dp^2$ --;
  zinc titanate) and Material E--;
  line 60, "(regenerated" and insert --(regenerated)--;
  line 62, "attribution" should read --attrition--.

Column 16, line 22, delete "≃";
  line 50, "flue" should read --fuel--.

Column 17, line 8, "coalbound" should read --coal-bound--.

Column 18, line 3, "tinq" should read --ting--;
  line 10, "cobalt (11)" should read --cobalt (II)--;
  line 10, "copper (11)" should read --copper (II)--.

Column 19, line 29, footnote b of Table IX, "having a" should read --having an--;
  line 32, "betonite" should read --bentonite--;
  line 43, "Gas I" should read --Gas II--;
  line 43, "Gas II" should read --Gas III--.

Column 20, line 29, after "Description" insert --of the--;
  line 42, after "in", insert --water) using--.

Column 21, line 44, "t the" should read --to the--.

UNITED STATES PATENT AND TRADEMARK OFFICE
CERTIFICATE OF CORRECTION

PATENT NO. : 5,254,516

DATED : October 19, 1993

INVENTOR(S) : Raghubir Gupta, et al

It is certified that error appears in the above-indentified patent and that said Letters Patent is hereby corrected as shown below:

Column 22, line 28, "VII" should read --VIII--;
line 57, "granulates" should read --granules--;
line 66, after "WO₃", insert --,--.

Column 23,
line 10, "Group" should read --Groups--;
line 21, "micron" should read --µm--;
line 25, "micron" should read --µm--.

Column 24, line 1, "contain" should read --containing--.

Signed and Sealed this

Twenty-seventh Day of September, 1994

Attest:

BRUCE LEHMAN

Attesting Officer

Commissioner of Patents and Trademarks